Jan. 28, 1964     G. F. GRAY     3,119,185

OPTICAL MEASURING INSTRUMENT

Filed Oct. 1, 1959

GEORGE FRANCIS GRAY
INVENTOR.

BY *Monte F. Mott*

ATTORNEY.

United States Patent Office 3,119,185
Patented Jan. 28, 1964

3,119,185
OPTICAL MEASURING INSTRUMENT
George Francis Gray, 536 S. Kenmore Ave.,
Los Angeles 5, Calif.
Filed Oct. 1, 1959, Ser. No. 843,810
2 Claims. (Cl. 33—46)

This invention has to do with optics and more particularly with optical and/or magnifying comparators.

Heretofore, optical measuring instruments and optical comparators have been exceedingly expensive. Those that may be considered of the economical variety have been undesirable for the reason that accurate results are difficult if not impossible to obtain. Parallax or visual distortion occurs which provides inaccurate results. The devices, heretofore, both the expensive and economical type, are delicate and not subject to use except under the most difficult to obtain conditions. Also, previous optical comparators were very restricted in their use. For instance, a comparator was applicable for one use but no other, or if additional uses were available accuracy of results was sacrificed for variety.

Additionally, measuring instruments and comparators, not of the optical type, did and do not incorporate therein a high degree of accurate results. Direct visual unaided readings were and are required.

An object of this invention is to provide an optical measuring instrument that gives extremely accurate results; that will withstand considerable abuse during use; that is readily available for use whenever needed due to its size; and that has an unrestricted number of uses.

Another object of this invention is to provide a reticle assembly to be applied to an optical measuring instrument that is work contacting and reduces parallax error to the very minimum.

A yet further object of this invention is to provide a reticle assembly to be applied to an optical measuring instrument that has a bezel of minimum thickness in order that the measuring component may be as close to the work as possible so that parallax error is virtually non-existent.

Another object of this invention is to provide an optical measuring instrument that may be fabricated from readily available materials and may also be fabricated in mass assembly techniques.

A yet further object of this invention is to provide an optical measuring instrument as well as a reticle assembly that is economical to manufacture, is readily usable by all skills and is of a durable construction.

Briefly, the invention comprises a light transmitting barrel having a reticle assembly releasably attached thereto. The reticle assembly includes a component having measuring indicia thereon. Telescoped within the barrel is a tube having magnifying optical elements that magnify the indicia in order that accurate work measurements and comparisons can be made.

Figure 1:
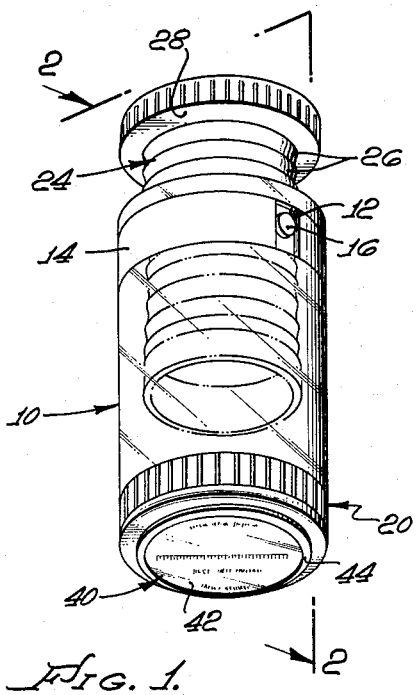
FIGURE 1 is a perspective view of the invention illustrating and having embodied therein the present invention.

Referring to the drawings for a more detailed description of the present invention, 10 designates an elongated, light transmitting or transparent and hollow barrel made of plastic material. Adjacent one end of the barrel is an annular groove 12 that receives a substantially annular leaf spring 14. A spacer projection 16 is located in the groove in order to keep the ends of the spring separated, and from turning. Also the projection 16 is an integral part of the barrel 10.

That end of the barrel 10, in opposed relationship to the groove 12, is reduced in diameter and is threaded as indicated by 18. The threaded end 18 is adapted to receive a cap 20 made of an opaque material that may be metal, plastic or any other suitable material. The cap 20 provides a tunnel effect which reduces light reflection or mirror effect which could inhibit accurate readings and results.

Figure 2:
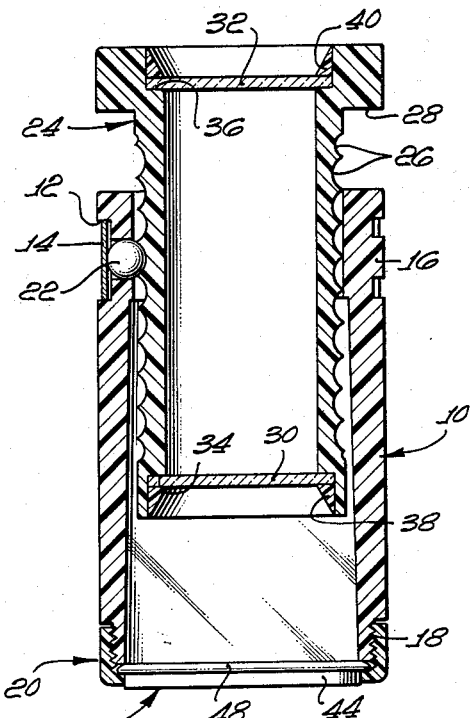
FIGURE 2 is an enlarged longitudinal cross-sectional view taken on line 2—2 of FIGURE 1.
Figure 3:
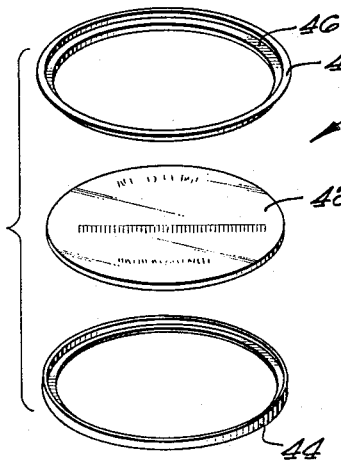
FIGURE 3 is a perspective exploded view of the reticle assembly.

Located in the groove 12 is an opening which receives a ball detent 22. The leaf spring 14 urges the ball detent toward the interior of the barrel 10 and prevents its removal or displacement from the exterior side of the barrel as may be determined by referring to FIGURE 2.

Telescoped within the barrel 10 is an elongated, generally hollow cylindrical tube 24 also fabricated of an opaque material that may be metal, plastic, or any other equally applicable composition. The exterior side of the tube 24 has coarse threads 26 thereon which are engaged by the ball detent 22 in order that the tube may be threaded into and out of the barrel 10. The upper or one end of the tube is enlarged to provide a shoulder 28 that functions as a stop when in engagement with the barrel 10. The enlarged portion of the tube 24 like the cap 20 is knarled for easy rotation.

Located adjacent each end of the tube 24 is an optical element 30 and 32 that in combination provide magnification. The optical elements abut against shoulders 34 and 36 and are retained in the tube by retainer rings 38 and 40.

The cap 20 when threaded onto the barrel 10 retains in place a reticle assembly broadly designated 40. The assembly includes a film or sheet of transparent material 42 having accurately defined indicia thereon. The indicia may be linear; it may define angles, circles or any other configuration or requirement. The film 42 is received in a circular bezel 44, L-shaped in radial cross section and having a cylindrical barrel portion 45, of uniform thickness, and a radially, inwardly extending, annular flange portion 47.

It is important to note that the bezel 44 may be stamped from extremely thin metal material. Also the bezel engages or is brought into contact with the work. The bezel illustrated is, of course, greatly exaggerated for purposes of illustration. However, in reality the thickness of the walls of the bezel are .003 of an inch. This very minute measurement or thickness virtually places the film 42 in contact with the work which results in reducing parallax to the very minimum if not entirely. Because of this minute thickness of the bezel walls, the user, regardless of how he moves his head when making measurements or comparisons, cannot create a parallax error of sufficient or harmful proportions.

The film 42 is retained in the bezel 44 by a generally Z-shaped in radial cross section retainer ring 46 that is pressed into the bezel. Retainer ring 46 includes a cylindrical barrel portion 49, and a radially, outwardly extending, annular lip or flange portion 48. However, the inverse order of assembly may be adopted.

Figure 4:
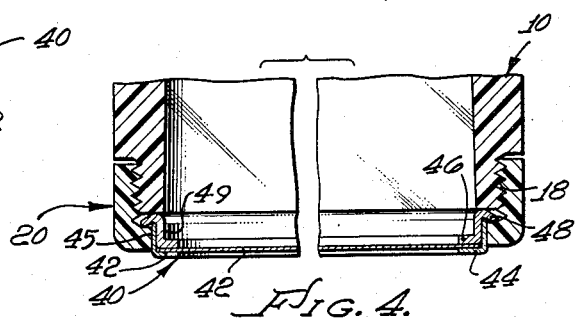
FIGURE 4 is an enlarged cross-sectional view of the reticle assembly illustrating the relationship of the various components.

Attention is directed to the fact that the annular flange 48 of the retainer ring 46 is received on a shoulder of the cap 20. The reticle assembly 40 is placed in the cap 20 in the manner illustrated in FIGURE 4 and then the cap is screwed onto the barrel 10.

The operation of the invention is as follows: The reticle assembly 40 having a film 42 with the proper indicia thereon is placed in the cap 20. The cap 20 is screwed or threaded onto the barrel 10. The entire device is then placed onto the work with the bezel 44 actually in contacting relationship.

Light, natural or artificial, properly located, enters through the barrel 10 and illuminates the indicia, and the work being measured. Tube 24 may be roughly adjusted up or down within the barrel 10 by pulling or pushing. This result is obtained due to the fact that the ball detent 22 is spring loaded and is resilient to an exerted force. Once a coarse adjustment of the tube 24 is accomplished, a fine optical adjustment may be made by rotating the tube 24. When the user obtains optimum optical clarity a measurement or comparison reading may be made.

Again attention is directed to the fact that because of the very thin wall thickness of the bezel 44, which is in contacting relationship with the work, very little if any parallax will result. Accurate results will be obtained regardless of the location of the user's eyes and head, providing, of course, proper adjustment of tube 24 is made. The optical elements are of sufficient magnification to enlarge the indicia for easy and ready reading.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A reticle assembly which comprises: a bezel, generally L-shaped in radial cross-section, which includes a cylindrical barrel portion having a uniform thickness, and a radially inwardly extending annular flange portion, the said annular flange portion being adapted to rest upon a work piece; a retainer, generally Z-shaped in radial cross-section, which includes a generally cylindrical barrel portion, a radially inwardly extending annular flange portion, and a radially outwardly extending annular lip portion which is inclined to form an acute angle with the outer surface of the barrel portion, and which is adapted to be removably received by a holder of an optical instrument for holding said reticle assembly, said retainer barrel portion being firmly, but removably nested within said bezel barrel portion and being in firm engagement with the inner surface of said bezel barrel portion; and a sheet of transparent material removably disposed between said inwardly extending annular flange portions, said sheet of material having indicia thereon.

2. A reticle assembly according to claim 1 wherein said radially inwardly extending flange of said bezel is about .003 inch in thickness.

References Cited in the file of this patent

UNITED STATES PATENTS

| | | |
|---|---|---|
| 1,775,952 | Turrettini | Sept. 16, 1930 |
| 2,026,176 | Jaeckel | Dec. 31, 1935 |
| 2,500,405 | Fairbank | Mar. 14, 1950 |
| 2,504,255 | De Lanauze | Apr. 18, 1950 |
| 2,580,674 | Griffin | Jan. 1, 1952 |
| 2,709,944 | Marx | June 7, 1955 |
| 2,813,458 | Tripp et al. | Nov. 19, 1957 |
| 2,874,610 | Wright | Feb. 24, 1959 |